United States Patent [19]

Ikin et al.

[11] 4,372,678
[45] Feb. 8, 1983

[54] LIGHT-MIXING SYSTEM

[75] Inventors: John B. Ikin, Leigh-on-Sea, England; Denis M. Neale, deceased, late of Brentwood, England, by Adeline I. Neale, executrix

[73] Assignee: Ciba-Geigy AG, Basel, Switzerland

[21] Appl. No.: 241,143

[22] Filed: Mar. 5, 1981

[30] Foreign Application Priority Data

Mar. 12, 1980 [GB] United Kingdom ............... 8008365

[51] Int. Cl.³ ..................... G03B 27/72; G03B 27/76
[52] U.S. Cl. ......................................... 355/37; 355/70
[58] Field of Search ................... 355/37, 70, 71, 38

[56] References Cited

U.S. PATENT DOCUMENTS

| | | | |
|---|---|---|---|
| 2,985,062 | 5/1961 | Clapp | 355/37 |
| 3,897,147 | 7/1975 | Simon | 355/37 X |
| 4,129,372 | 12/1978 | Allgeier | 355/35 X |
| 4,132,478 | 1/1979 | Long et al. | 355/70 X |

FOREIGN PATENT DOCUMENTS

| | | |
|---|---|---|
| 932880 | of 1955 | Fed. Rep. of Germany . |
| 1747380 | of 1958 | Fed. Rep. of Germany . |
| 1158823 | of 1963 | Fed. Rep. of Germany . |
| 1447459 | of 1970 | Fed. Rep. of Germany . |
| 102821 | of 1974 | German Democratic Rep. . |

*Primary Examiner*—Richard A. Wintercorn
*Attorney, Agent, or Firm*—Harry Falber

[57] ABSTRACT

An enlarger head for multigrade paper is described which comprises a light mixing system for mixing light from two sources.

The system comprises disposed along a longitudinal axis a solid light-mixing member of an optically clear material which has as a light-input face a generally planar sulcated face having grooves therein of equilateral triangular cross-section and a substantially smooth light-output face, said two light sources being diametrically opposed relative to the longitudinal axis and each being adapted to direct light onto said light-mixing member from an angle substantially 60° relative to said longitudinal axis, the general plane of said sulcated face of the light-mixing member being disposed normal to the said longitudinal axis and the grooves therein having smooth polished surfaces and extending normal to a plane containing both light sources and the longitudinal axis, light from the two sources passing through the light-mixing member to emerge therefrom substantially along the longitudinal axis.

5 Claims, 3 Drawing Figures

LIGHT-MIXING SYSTEM

This invention relates to photographic copying apparatus and to a light mixing means for use therewith.

In photographic copying apparatus of the projection printing type as opposed to the contact printing type light from a light source is directed through a photographic transparency and then focussed on to photosensitive print material located beneath by a lens system to expose the photosensitive material.

For some photographic printing purposes it is required that the photosensitive material is exposed simultaneously to light from at least two light sources. Such light sources usually emit light in different wavebands. Examples of printing processes which require the simultaneous use of light from two or more light sources are the printing of variable contrast black and white photographic material and the printing of colour print material.

Certain difficulties are encountered when it is required to use simultaneously light from at least two light sources and the chief of these is the necessity to mix the light from the two sources as completely as possible consistent with using the light as efficiently as possible. The necessity to mix light adequately from two sources has led to the production of printing apparatus with very large light mixing chambers which make the apparatus very bulky and of low light utilisation efficiency.

For example the large integrating boxes: BP No. 1,539,468, the long clear rods: U.S. Pat. No. 4,129,372 and long internally reflecting mixing ducts: U.S. Pat. No. 4,132,478.

We have discovered a light mixing means for use with a photographic copying apparatus which is not bulky, which mixes well the light from the two sources but nevertheless is efficient in the use of the light.

Therefore according to the invention there is provided an illumination system for a photographic copying apparatus for mixing light from two light sources, which illumination system comprises disposed along a longitudinal axis a solid light-mixing member of an optically clear material which has as a light-input face a generally planar sulcated face having grooves therein of equilateral triangular cross-section and a substantially smooth light-output face, said two light sources being diametrically opposed relative to the longitudinal axis and each being adapted to direct light onto said light-mixing member from an angle substantially 60° relative to said longitudinal axis, the general plane of said sulcated face of the light-mixing member being disposed normal to the said longitudinal axis and the grooves therein having smooth polished surfaces and extending normal to a plane containing both light sources and the longitudinal axis, light from the two sources passing through the light-mixing member to emerge therefrom substantially along the longitudinal axis.

When the light emerges mixed from the said light mixing member it passes through a condenser lens or a diffusing screen or both and thence through a photographic transparency, through an objective lens to the photosensitive material to effect exposure thereof.

Suitable materials of construction for the light mixing member are clear glass or clear plastics material for example polystyrene or polymethylmethacrylate. The material must have a refractive index of at least 1.16 and preferably exceeding 1.31.

The optical systems employed to direct light from the light sources onto the sulcated face of the light mixing member are such that the beams of light are slightly diverging. That is to say they diverge from the parallel by up to 10°. This ensures that the beams of light from the two light sources upon emerging from the light mixing member are overlapped and hence substantially mixed.

Alternatively the two beams of light can be partially mixed within the light mixing member and only mixed fully after leaving the light mixing member by virtue of their continued divergence. In this case the light mixing member can be of thinner material but needs to be placed beyond the focal plane of the condenser lens used for collecting the light.

Usually, that is to say for most purposes, a colour selective filter is present in the path of the light from at least one of the two sources and most generally colour selective filters of different characteristics are in the paths of light from both of the two light sources.

In a modification to the illumination system of the present invention one of the two light sources comprises two lamps and a beam splitter is present which functions as a beam combiner, the two lamps being so arranged that a single beam of light from the beam splitter is directed on to the sulcated face of the light-mixing member at an angle of substantially 60° relative to the longitudinal axis of the system. The beam splitter used as the beam combiner may be colour selective.

The accompanying drawings will serve to illustrate the invention. It is to be understood that the drawings do not include parts of the photocopying apparatus such as the negative holder, the print material holder and the light objective lens system which are not part of the illumination system of the present invention.

Figure 1:
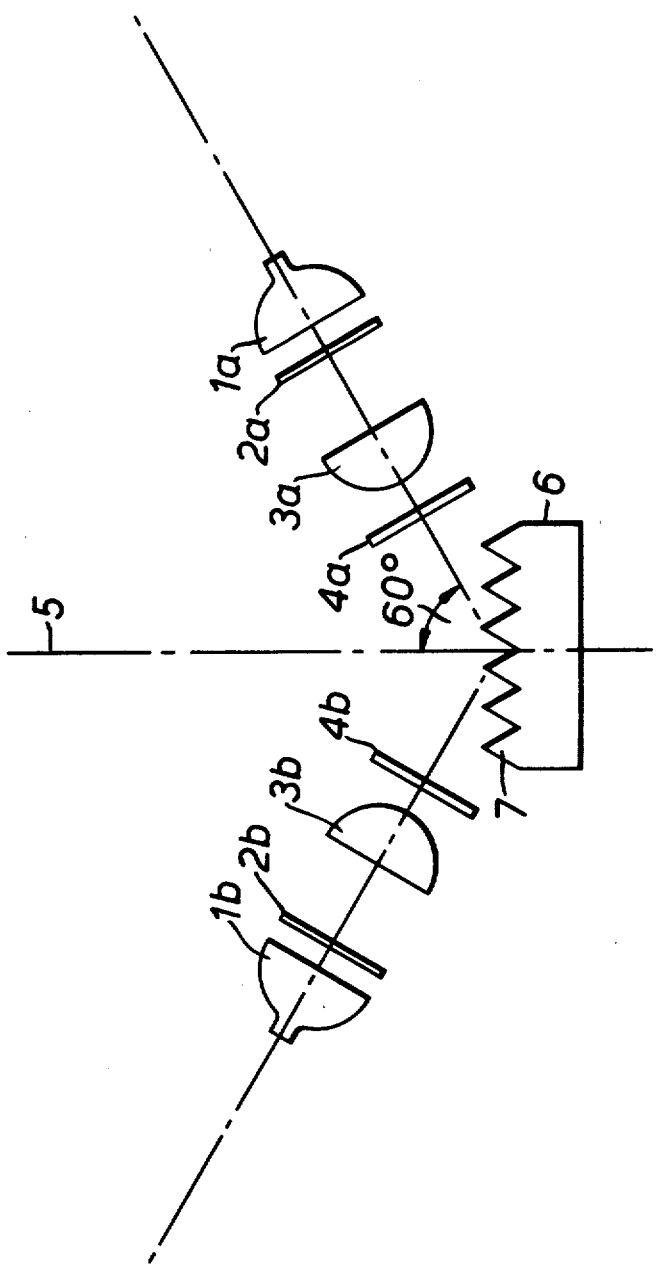
FIG. 1 is a diagrammatic cross sectional side elevation showing the relative disposition of the various components.

In FIG. 1 there is shown an illumination system for a photographic copying apparatus which comprises two light sources each of which consists of a filament lamp 1 (a and b), a heat filter 2 (a and b), a condenser lens 3 (a and b) which act as partial collimators, and a colour filter 4 (a and b). In practice 1a and 1b, 2a and 2b and 3a and 3b will be identical but 4a and 4b will be different, passing light in different but possibly overlapping wavelengths. The longitudinal axis is indicated by line 5.

The light from each light source passes to the light-mixing member 6 which bears on its face a series of grooves 7 of equilateral triangular cross-section. The light-mixing member is composed of clear polymethylmethacrylate. The base of the light mixing member can be of circular, square or rectangular cross section.

Figure 2:
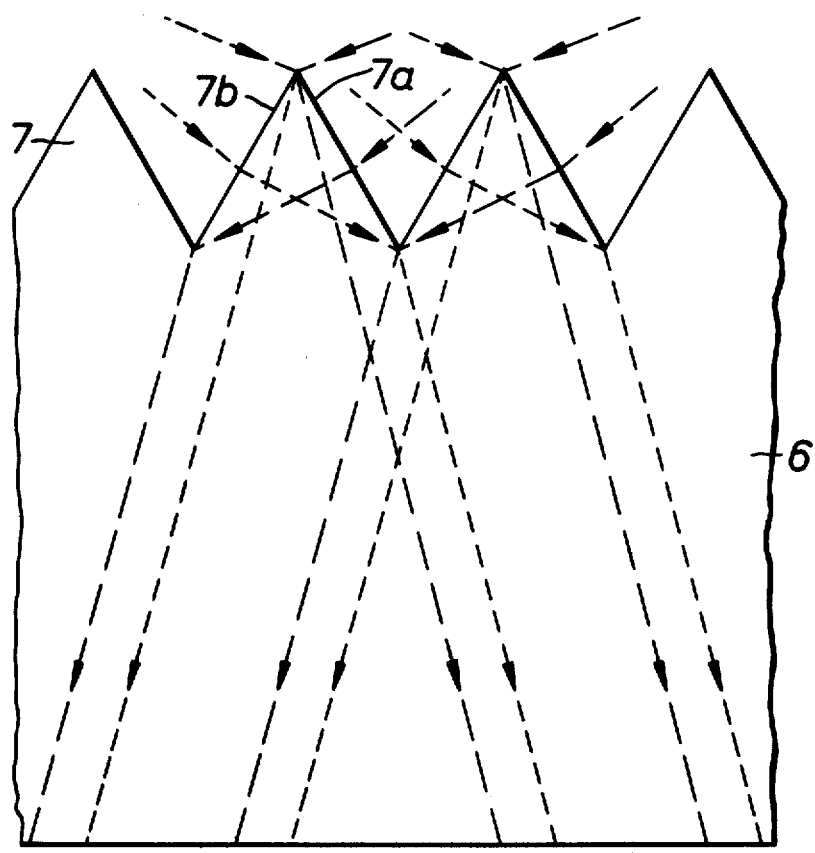
FIG. 2 is a cross sectional side elevation of part of the light mixing member showing the internal reflection and mixing of the beams from the two light sources.

As shown in FIG. 2, the diverging light from each light source strikes alternate facets 7a and 7b in the sulcated face 7 of the light mixing member 6. The light is internally reflected from facets 7b and 7a respectively and continues to diverge so that at the light output face of the light mixing member 6 the beams of light from the two light sources are overlapped and substantially mixed.

For the sake of ease of presentation and to indicate more clearly the path of the light into the light mixing means only three grooves of equilateral triangular cross section are shown. In practice many more may be used to provide completely adequate mixing of light.

For example in one apparatus the diameter of the light mixing member was 70 mm with a thickness of 5 mm. the number of grooves in its light-input surface was 69 and the divergence of the beams ±7°. The refractive index of the material was 1.5. In this case the light mixing member was placed beyond the focal plane of the condenser lens.

When high efficiency of light utilisation is particularly required a condenser lens system can be used according to known practice, to collect light emerging from the light mixing member and to direct it through the film transparency and into the objective lens.

Figure 3:
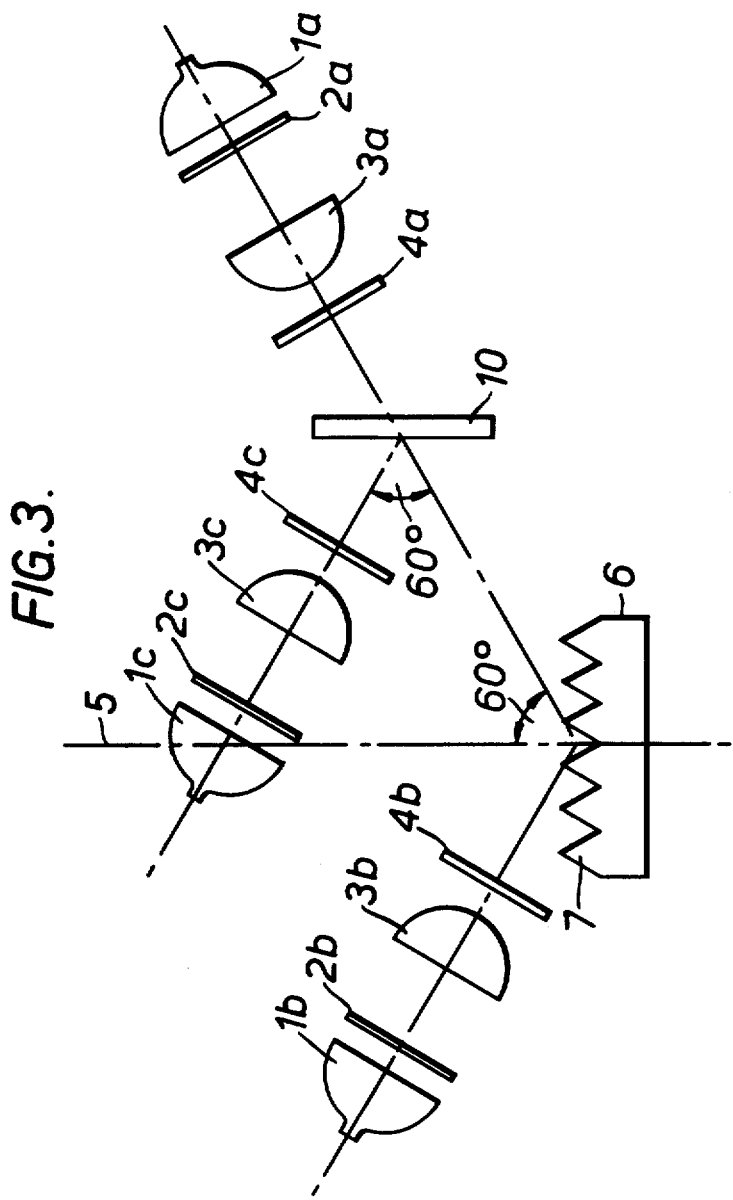
FIG. 3 is a diagrammatic cross-sectional side elevation of a modification to the illumination system illustrated in FIG. 1.

In FIG. 3 there is shown a modification of the illumination system of the present invention. In this figure the same numbers represent the same features as in FIG. 1 but there is present also another filament lamp 1c, another heat filter 2c, another partial collimating lens 3c and another colour filter 4c. There is also present a beam combiner 10. Light from lamp 1a passes straight through the beam combiner 10 while light from lamp 1c is reflected through 60° by the beam combiner and follows the same path as the light from lamp 1a to the light-mixing member 6.

Preferably the beam combiner 10 is a dichroic mirror which reflects light of the colour passed by colour filter 4c but transmits freely light of the colour passed by filter 4a.

Alternatively the beam combiner can be another sulcated light mixing member. If it is required to expose the print material to three different wavelength bands of light then colour filter 4c is different from both colour filter 4a and 4b. The waveband passed by filter 4b should then be intermediate between the wavebands passed by filters 4a and 4c. For example, filters 4a, 4b, and 4c may be selected to pass red, green and blue light respectively. In some circumstances it is required to provide light in only two wave-bands, but much more light of one colour is required than light of the other colour. In such a case both the filters 4b and 4c can be of the same colour, the light from lamp 1c being used to reinforce the light from lamp 1b when so required.

We claim:

1. An illumination system for a photographic copying apparatus for mixing light from two light sources, which illumination system comprises disposed along a longitudinal axis a solid light-mixing member of an optically clear material which has as a light-input face a generally planar sulcated face having grooves therein of equilateral triangular cross-section and a substantially smooth light-output face, said two light sources being diametrically opposed relative to the longitudinal axis and each being adapted to direct light on to said light-mixing member from an angle substantially 60° relative to said longitudinal axis, the general plane of said sulcated face of the light-mixing member being disposed normal to the said longitudinal axis and the grooves therein having smooth polished surfaces and extending normal to a plane containing both light sources and the longitudinal axis, light from the two sources passing through the light-mixing member to emerge therefrom substantially along the longitudinal axis.

2. An illumination system according to claim 1 wherein the optical systems employed to direct light from the light sources on to the sulcated face of the light-mixing member are such that the beams of light from each source when they reach the sulcated face are slightly diverging.

3. An illumination system according to any one of claims 1 or 2 wherein a colour-selective filter is present in the path of the light from at least one of the two sources.

4. An illumination system according to any one of claims 1 or 2 wherein one of the two light sources comprises two lamps and a beam splitter is present which functions as a beam combiner, the two lamps being so arranged that a single beam of light from the beam splitter is directed on to the sulcated face of the light-mixing member at an angle of substantially 60° relative to the longitudinal axis of the system.

5. An illumination system according to claim 4 wherein beam splitter is colour selective.

* * * * *